United States Patent [19]

Tamura et al.

[11] Patent Number: 5,749,548

[45] Date of Patent: May 12, 1998

[54] THERMAL INSULATING SUPPORT DEVICE FOR PIPING

[75] Inventors: Kouji Tamura, Aichiken; Mamoru Morohashi, Yokohama; Akira Okada, Kamakura; Kenji Matsumura; Satoshi Hama, both of Yokohama, all of Japan

[73] Assignee: JGC Corporation, Japan

[21] Appl. No.: 724,273

[22] Filed: Sep. 19, 1996

[30] Foreign Application Priority Data

Aug. 22, 1996 [JP] Japan .................................. 8-221315

[51] Int. Cl.⁶ .............................. F16B 7/00; F16L 3/00; F16M 13/00
[52] U.S. Cl. ............................ 248/49; 248/65; 248/73; 248/176.2
[58] Field of Search .................................. 248/49, 65, 73, 248/176.2

[56] References Cited

U.S. PATENT DOCUMENTS

| 3,980,262 | 9/1976 | Lee | 248/49 |
|---|---|---|---|
| 4,534,535 | 8/1985 | Maeda et al. | 248/49 |
| 4,953,801 | 9/1990 | Oikawa | 248/65 |

FOREIGN PATENT DOCUMENTS

| 4315603 | 12/1993 | Germany | 248/49 |

*Primary Examiner*—Victor N. Sakran
*Attorney, Agent, or Firm*—Greer, Burns & Crain, Ltd

[57] ABSTRACT

A thermal insulating support device for piping comprises a base frame constituted by a bottom plate, a pair of side plates and a pair of end plates integrally formed with each other; a support frame of a plate shape and formed with a support hole, the support frame being fixed at a bottom of the piping; and a support shaft made of resin or ceramic material extending through the support hole of the support frame and fixedly supported by the pair of side plates on the base frame, the support shaft having thermal insulation properties and mechanical strength sufficient for supporting the piping.

2 Claims, 11 Drawing Sheets

THERMAL INSULATING SUPPORT DEVICE FOR PIPING

BACKGROUND OF THE INVENTION

1. Field of the Invention

The present invention relates to a thermal insulating support device for piping which supports piping for transporting cryogenic-temperature fluids of various kinds in a reliable and thermal-insulated manner.

2. Description of the Related Art

To install piping for transporting cryogenic-temperature fluids such as LNG (liquified natural gas) in specified locations during the construction of various types of plants, etc., a support device capable of reliably supporting the weight of the piping and the fluid contained in the piping and having an appropriate thermal insulation performance is required.

One such support device as described above is a support device A as shown in FIG. 8, wherein a thermal insulating member constituted by urethane blocks A1a, A1b and A1c are affixed to the periphery of a pipe P, being covered by a pair of pipe clamps A2a, A2b, pipe P being supported at a prescribed location by means of a shoe A3 that is fixed to pipe clamp A2a.

However, the support device A constructed as described above was subject to the inconveniences that the various urethane blocks A1a to A1c were special-purpose products that had to be formed matching the size of the pipe (i.e. its external diameter). Thus, manufacturing costs in factories were very high and the personnel expenses associated with management of the various product units from design up to final manufacture were enormous.

Also, because assembling the support device on site was a low-efficient work, when the situation arose that piping was required to be altered on site, there was the inconvenience that the work had to be interrupted until piping supporting devices matching the location of such alteration are delivered. This was not only an obstacle to management of the work process, but also it led to severe increases in various costs such as urgent additional orders or arranging for transportation, etc.

Furthermore, if the clamping force provided by the pipe clamp became loose due to differences in thermal expansion between the pipe and the insulating material when the cryogenic-temperature fluid was being transported after completion of the pipe installation work, slippage could occur between the urethane blocks and the pipe, causing damage to the thermal insulating support device, making it impossible for it to perform its function. This was a further inconvenience.

In order to eliminate such inconveniences, the inventors have proposed in Japanese patent application (patent application number 7-62858) a thermal insulating support device B as shown in FIG. 9 to FIG. 11.

The thermal insulating support device B comprises a base frame B1 made of metallic material having a pair of side plates B1a, a support frame B2 made of metallic material constituted by support pipes B2b provided on a shoe B2a fixedly provided at the bottom of pipe P, and support shafts B3 made of material that provides thermal insulation and sufficient mechanical strength to support the weight of pipe P and the fluid within it; the construction is such that pipe P is supported by fixing both ends of support shafts B3 that pass through support pipes B2b, B2b on to side plates B1a of base frame B1.

Furthermore, in this thermal insulating support device B, for the purpose of restricting the movement of pipe P to left and right, sleeves B4 having thermal insulating characteristics are provided to support shafts B3 and the interior of thermal insulating support device B is filled with a foamed thermal insulating material B5 (FIG. 10). In addition, a pre-molded thermal insulating member B6 is attached to pipe P.

Thus, with the thermal insulating support member B as described above, the various inconveniences resulting from the construction of the conventional thermal insulating support device described above, such as the large costs associated with design and manufacture, the inconvenience of process management involved in altering the piping on site and increased costs due to the need for re-procurement and in addition the loss of functionality when used for transporting cryogenic-temperature fluids, can be effectively eliminated.

However, with the thermal insulating support device B of the construction described above, since the support pipes B2b of support frame B2 extend along the axial direction of support shafts B3, the contact area of support shaft P and support shafts B3 becomes unnecessarily large, with the result that much of the cryogenic energy that is transmitted from piping P to support frame B2 flows out through support pipes B2b, thereby tending to lower the thermal insulation characteristics. This represented an inconvenience.

Also, with the thermal insulating support device B constructed as above, in base frame B1 that supports pipe P through support frame B2 and support shafts B3, the support shafts B3 are supported by a pair of left and right side plates B1a, so they are liable to deformation such as tipping over or twisting when strong forces act on the piping system.

Furthermore, there is a risk of damage to base frame B1 resulting in damage to support shafts B3 and, further, support frame B2, with the inconvenience that the damaged thermal insulating support device B will no longer be able to support piping P.

SUMMARY OF THE INVENTION

Having regard to the circumstances described above, the present invention aims to further improve thermal insulation performance and mechanical strength, and its object is to provide a thermal insulating support device for piping capable of achieving reliable thermal insulation and support of piping without unnecessary increase in costs.

A thermal insulating support device for piping according to the present invention comprises a base frame constituted by a bottom plate, a pair of side plates and a pair of end plates integrally formed with each other; a support frame of a plate shape and formed with a support hole, the support frame being fixed at a bottom of the piping; and a support shaft made of resin or ceramic material extending through the support hole of the support frame and fixedly supported by the pair of side plates on the base frame, the support shaft having thermal insulation properties and mechanical strength sufficient for supporting the piping.

With the above construction, since the support frame of the thermal insulating support device presents the shape of a plate, the portion that is in contact with the support shaft passing through the hole in the support plate is only in contact over a restricted range corresponding to the plate thickness of the support frame. Therefore, the cryogenic energy transmitted from the support frame to the support shaft is therefore very little, thereby avoiding unintended lowering of the thermal insulation performance.

Also with the above construction, the mechanical strength of the baseplate is increased by making it of a box shape by forming the base frame by combining in integrated fashion a bottom plate with a pair of side plates and a pair of end plates.

Consequently, with the thermal insulating piping support device according to the present invention, compared with the conventional thermal insulating support device equipped with a support frame constituted by providing support pipes on a shoe, thermal insulation performance is greatly increased. Further, compared with a conventional thermal insulating support device equipped with a base frame consisting of a bottom plate and a pair of side plates, the mechanical strength of the base frame can be greatly increased. Therefore, the pipe can be supported in reliable manner without any possibility of damage to the thermal insulating support device.

DESCRIPTION OF THE PREFERRED EMBODIMENTS

Figure 1:
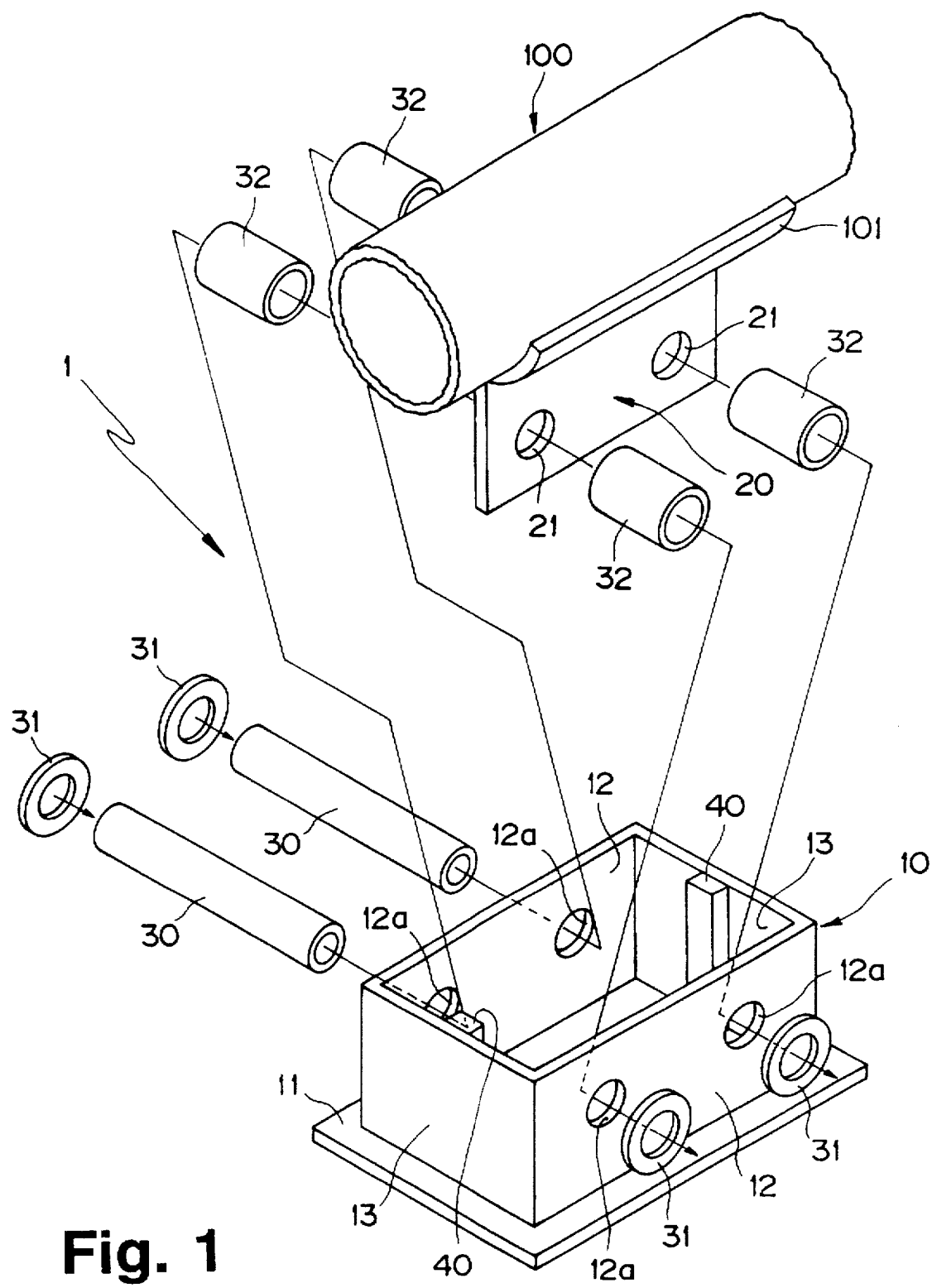
FIG. 1 is an exploded perspective view showing a thermal insulating support device for piping according to the present invention.

FIG. 1 to FIG. 5 illustrate an example wherein a pipe for transport of cryogenic-temperature fluid such as LNG (liquified natural gas) in a chemical plant is supported by a thermal insulating support device for piping according to an embodiment of the present invention. As is clear from FIG. 1 to FIG. 5, the thermal insulating support device 1 comprises a base frame 10 and a support frame 20.

Base frame 10 is made of a suitable metallic material such as iron or steel with the object of providing sufficient mechanical strength and comprises a base plate 11 that extends in the horizontal plane, a pair of side plates 12 arranged facing each other and erected in the base plate 11, and a pair of end plates 13 likewise arranged facing each other and erected on the base plate 11.

The base plate 11, pair of side plates 12 and pair of end plates 13 are formed in integrated fashion by fixing them together by a method such as welding. Because of its shape of an upwardly open box, the base frame 10 has very great mechanical strength and extremely high rigidity.

The pair of side plates 12 in base frame 10 are formed with support holes 12a in which are inserted the ends of support shafts 30 so that the support shafts, to be described later, are supported.

Base frame 10 is arranged at a prescribed location on for example a pillar or beam, not shown in the drawings, forming part of the plant structure.

Support frame 20, like base frame 10, is constituted of a suitable metallic material such as iron or steel for the purpose of providing sufficient mechanical strength. The support frame 20 presents the shape of a plate and is fixed at the bottom of pipe 100 in a condition extending along the axial direction of pipe 100 and extending in the vertical direction.

Support frame 20 is formed with two support holes 21 through which are inserted the support shafts 30.

Support frame 20 is mounted on the bottom of pipe 100, more precisely, on an abutment plate 101 that is fixed to the bottom of pipe 100. This support plate 101 is formed by cutting part of a pipe or by bending a plate member of material similar to that of the pipe.

It should be noted that support frame 20 could be fixed directly to the pipe without using abutment plate 101.

Figure 3:
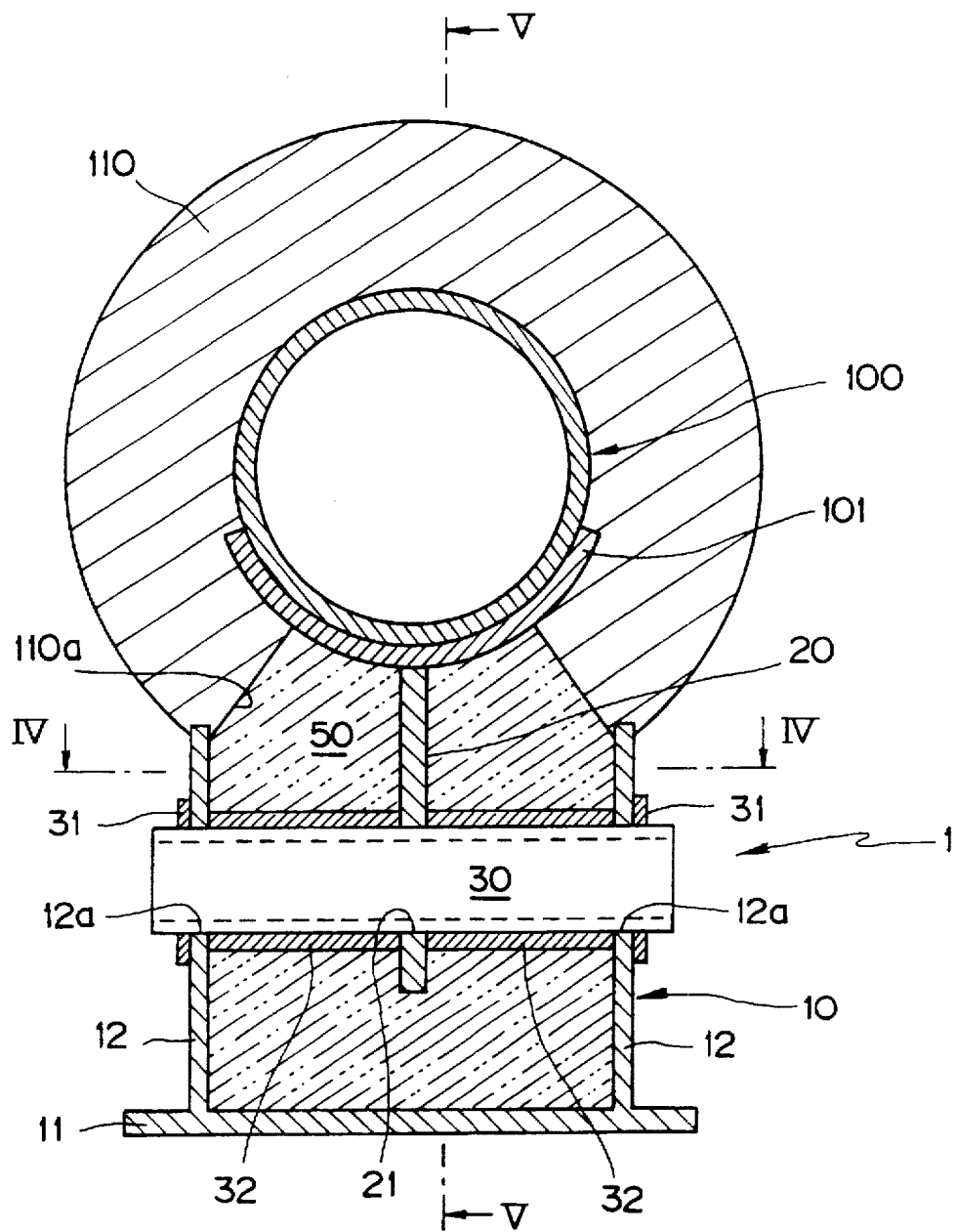
FIG. 3 is a cross-sectional view along the line III—III in FIG. 2.
Figure 4:
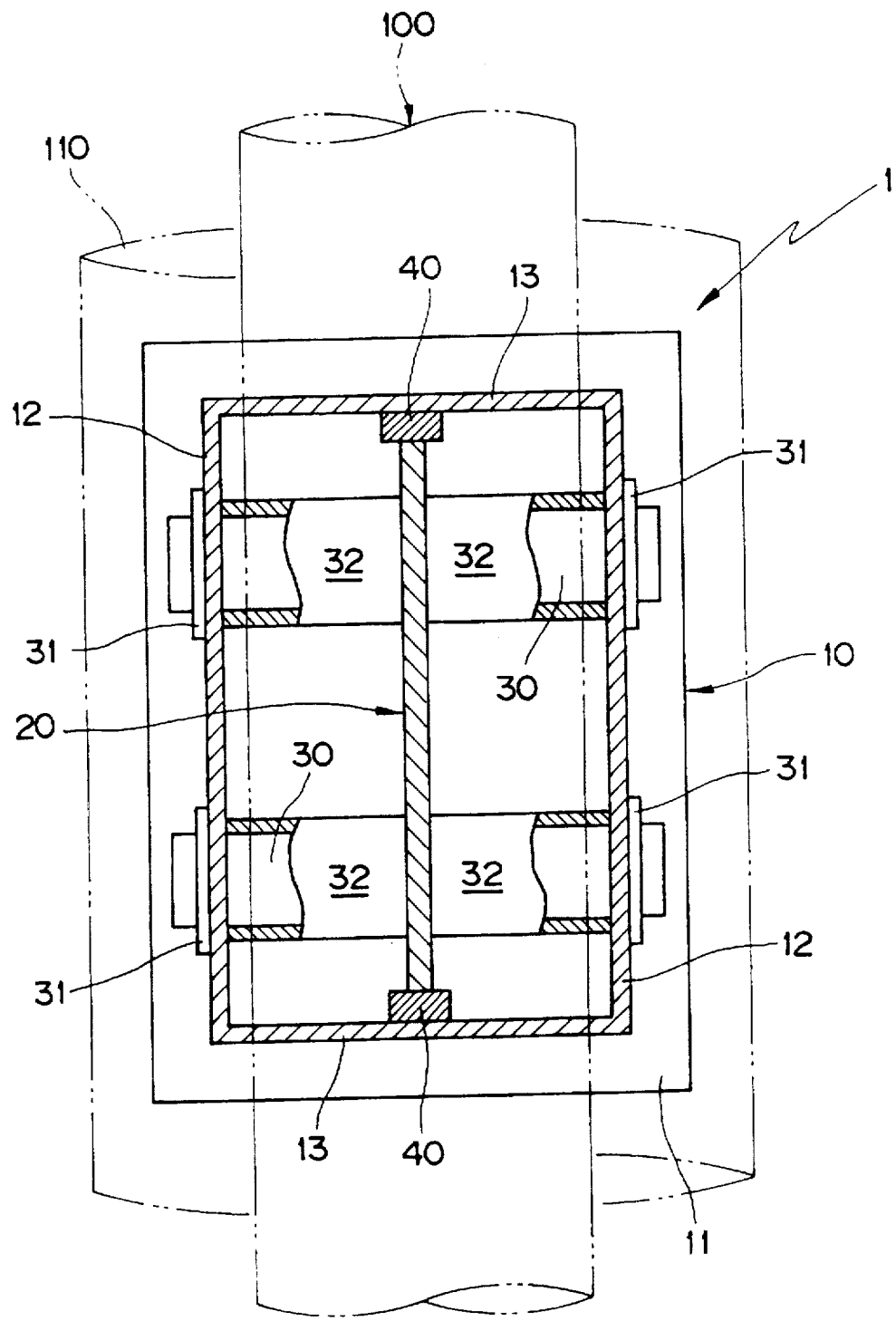
FIG. 4 is a cross-sectional view along the line IV—IV in FIG. 3.

As shown in FIG. 3 and FIG. 4, in base frame 10 there are arranged two support shafts 30 in a horizontally extending condition. These two support shafts 30 extend passing horizontally through support holes 21 of support frame 20.

Also, the left and right ends of support shafts 30 are inserted into support holes 12a of side plates 12 in base frame 10 so that the support shafts 30 are supported in a condition extending across side plates 12 and are fixed to base frame 10 by means of stop rings 31 that are stuck onto their left and right ends.

Support shafts 30 are made of a resin material, specifically FRP (fibre reinforced plastic) that has sufficient mechanical strength to support pipe 100 and provides sufficient thermal insulation.

Stop rings 31 are formed of the same material as support shaft 30, or material providing thermal insulation and mechanical strength approximating to that of support shaft 30 such as ceramic material.

In addition, sleeves 32 to restrict movement of support frame 20 in the transverse direction are mounted on support shafts 30 on both the left and right sides of support frame 20, interposed between support frame 20 and side plates 12 of base frame 10.

These sleeves 32 are formed of resin material which is the same as that of support shaft 30 or material providing mechanical strength and thermal insulation approximating to that of support shaft 30 such as ceramic material.

Also, on the inside faces of the pair of end plates 13 in base frame 10, there are arranged stopper blocks 40 to restrict movement of support frame 20 in the axial direction, such as to be interposed between the edges in support frame 20 and the end plates 13.

These stopper blocks 40 are formed of a suitable material providing mechanical strength and thermal insulation equal to or better than that of support shafts 30, for example of the same resin material as support shafts 30 or ceramic material.

Figure 2:
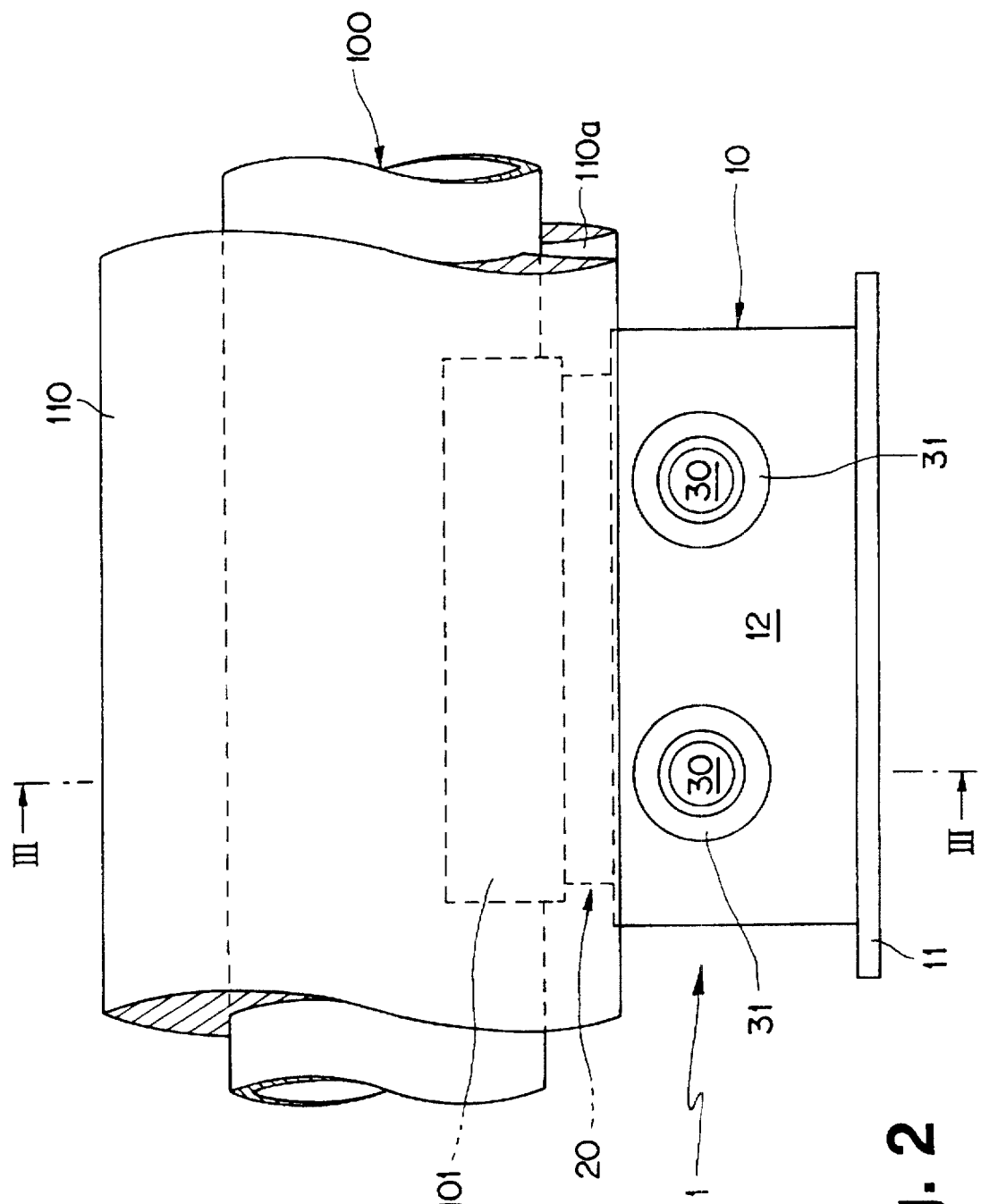
FIG. 2 is an overall side view showing the thermal insulating support device for piping in use according to the present invention.

Furthermore, as shown in FIG. 2 and FIG. 3, pre-formed thermal insulating member 110 is mounted at the circumference of pipe 100. The thermal insulating member 110 is formed with an opening 110a in a condition avoiding thermal insulating support device 1 described above.

Furthermore, as shown by the chain line in FIG. 3, foamed thermal insulating material 50 is introduced by an on-site operation into the empty space portions in thermal insulating support device 1 and/or into the empty space portions of thermal insulating support device 1, pipe 100 and thermal insulating member 110.

Figure 5:
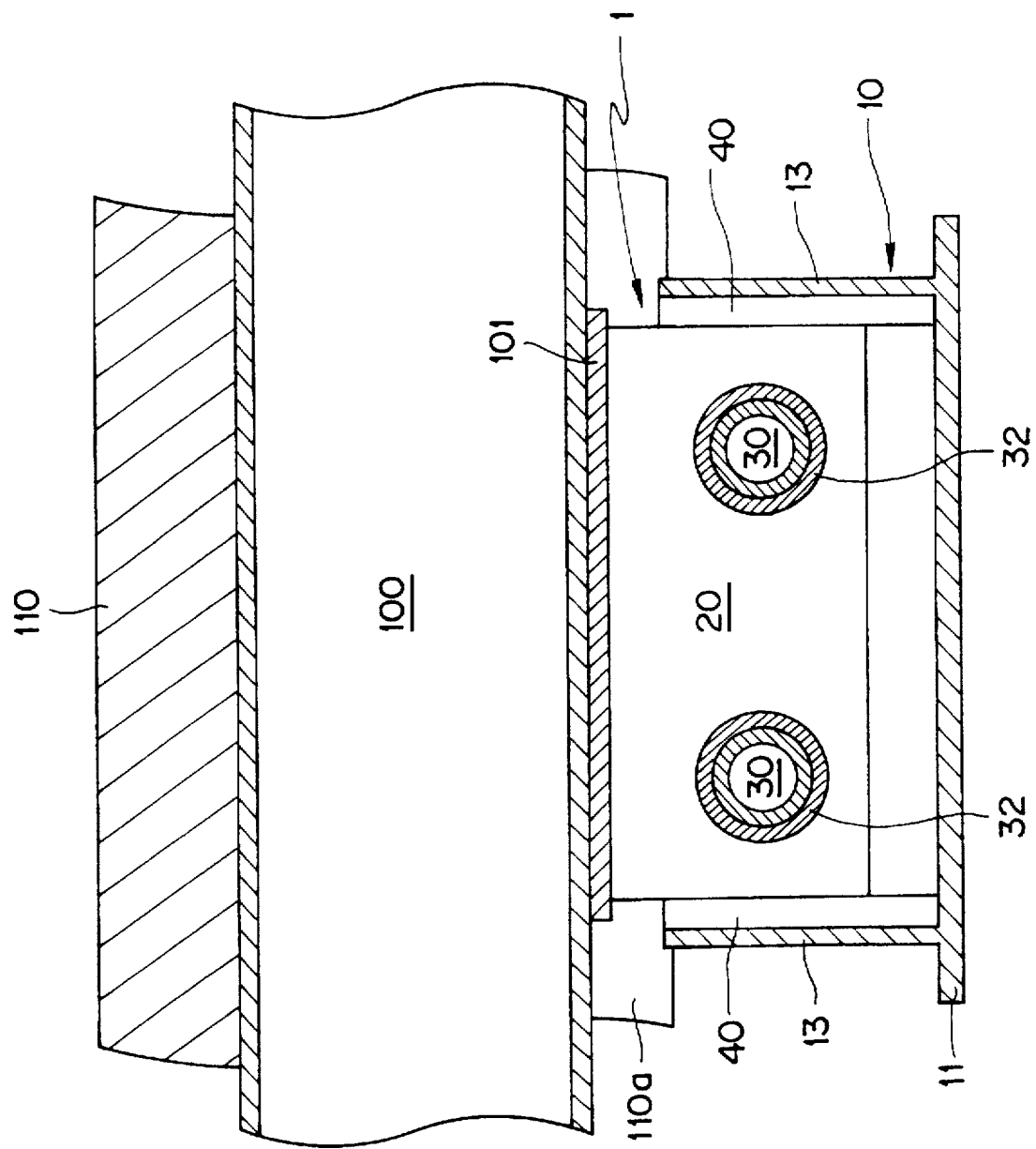
FIG. 5 is a cross-sectional view along the line V—V of FIG. 3.

However, in order to show clearly the construction of the thermal insulating support device 1 this thermal insulating material 50 is not shown in FIG. 4 and FIG. 5.

With the thermal insulating support device 1 constructed as described above, the weight of pipe 100 and the fluid within it can be reliably supported by base frame 10 through support shafts 30 from support frame 20.

Also, by supporting support frame 20 that is fixed to pipe 100 on base frame 10 using support shafts 30 provided with thermal insulating properties, in other words, by interposing support shafts 30 provided with thermal insulating properties between support frame 20 and base frame 10, a very effective thermal insulating effect is obtained, enabling thermal loss causing rising temperature of the cryogenic-temperature fluid to be minimized.

Also, an excellent thermal insulating effect is obtained by filling the spaces in the interior of thermal insulating support device 1 and/or the spaces of thermal insulating support device 1, pipe 100 and thermal insulating member 110, with foamed thermal insulating material 50 by an on-site operation.

Furthermore, since support frame 20 in thermal insulating support device 1 presents a plate shape, the portion where it is in contact with support shaft 30 passing through support hole 21 is restricted to a narrow range corresponding to the plate thickness of support plate 20. Therefore, the cryogenic energy transmitted from support plate 20 to support shaft 30 is very small, so that it cannot cause an unintended drop in the thermal insulation performance.

Figure 9:
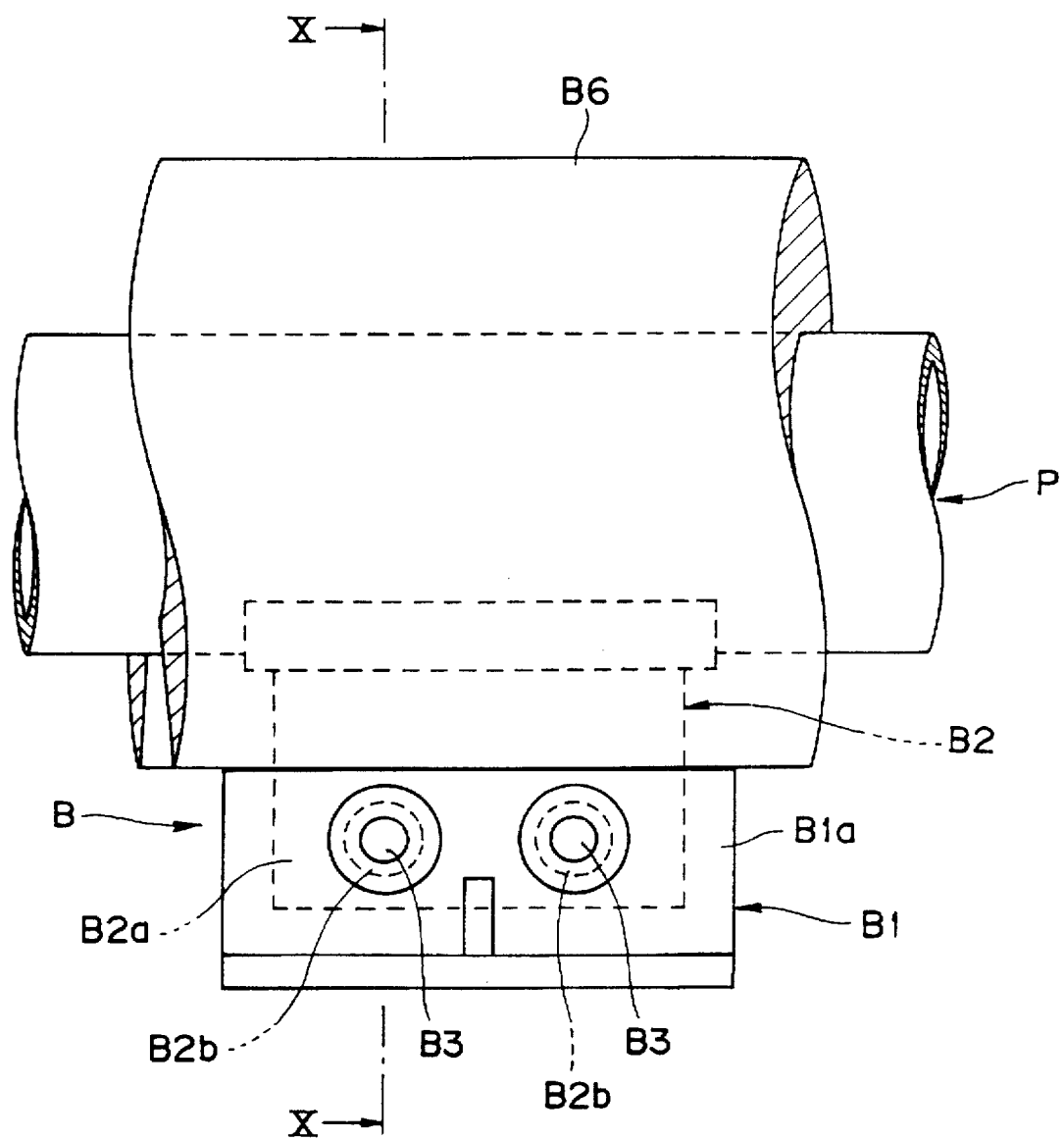
FIG. 9 is an overall side view illustrating the conventional thermal insulating support device for piping in use.
Figure 10:
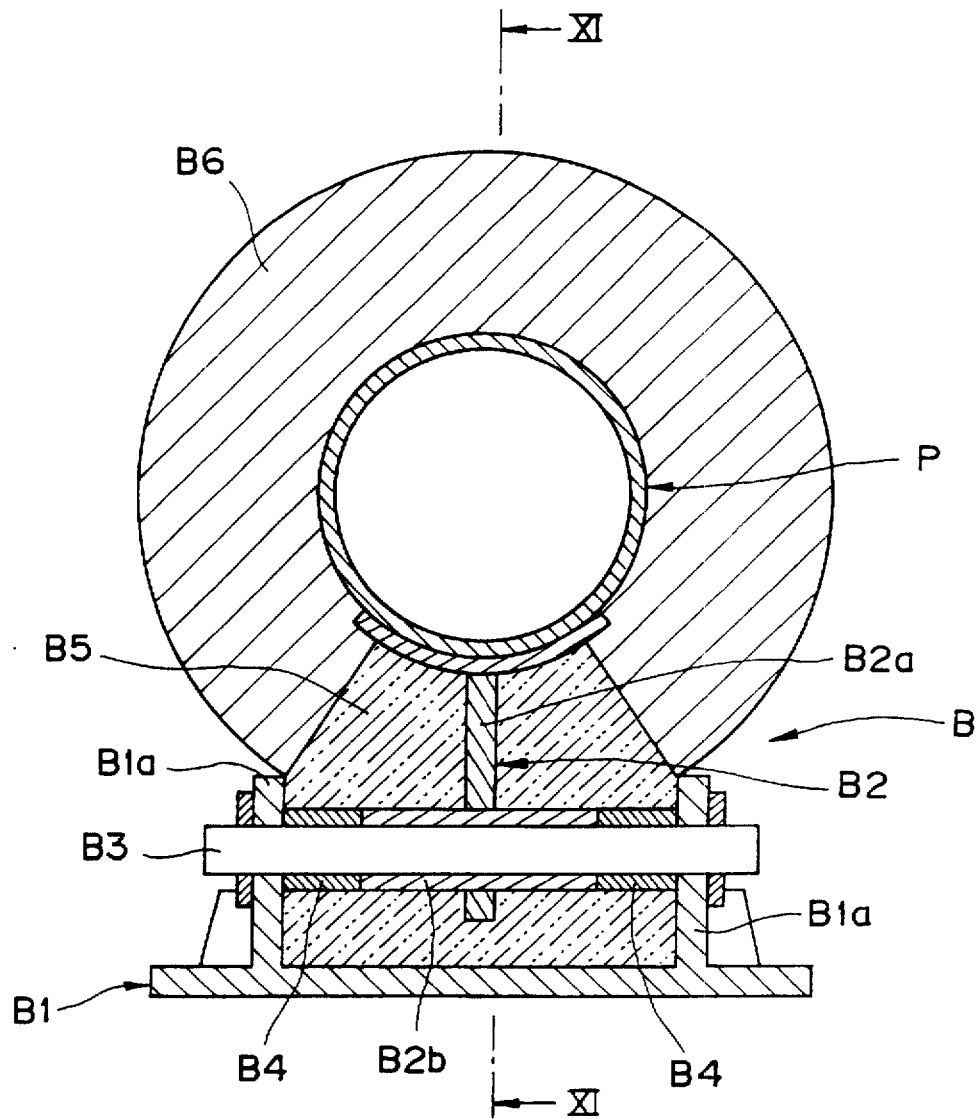
FIG. 10 is a cross-sectional view along the line X—X of FIG. 9.
Figure 11:
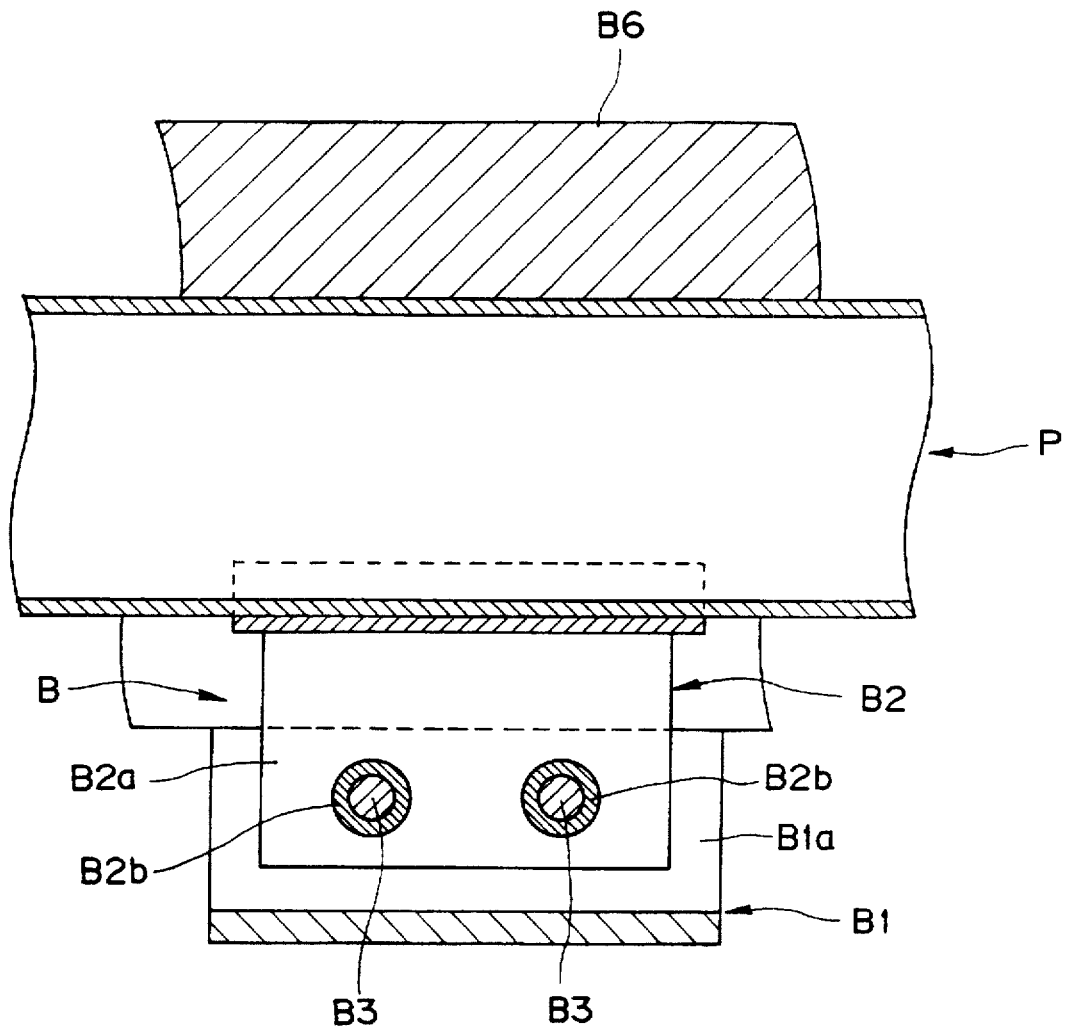
FIG. 11 is a cross-sectional view along the line XI—XI of FIG. 10.

Furthermore, by making base frame 10 in thermal insulating support device 1 of a box shape wherein a base plate 11, a pair of side plates 12 and a pair of end plates 13 are formed in integrated fashion as described above, much greater mechanical strength can be achieved than with the conventional base plate (see FIG. 9 to FIG. 11) consisting of base plate and a pair of side plates. Consequently, even if the piping is subjected to external force, there is no possibility of base plate 10 tipping over or twisting etc., so pipe 10 can be reliably supported.

In contrast, with the conventional base frame, it is necessary to provide external steel reinforcements in order to obtain the same degree of mechanical strength as base frame 10 of the embodiment, and this in turn means that constructions such as foundations must be provided to support the steel reinforcements, necessitating huge costs and an extensive installation space. In contrast, with the base plate 10 in thermal insulating support device 1, there is no need at all for auxiliary equipment such as steel reinforcements or foundations etc.

When a large force in the left or right direction perpendicular to the axis acts on pipe 100 supported in thermal insulating support device 1, this force is transmitted from support frame 20 through sleeves 32 to the side plates 12 of base frame 10 and is borne by the whole base frame 10. Therefore, pipe 100 is supported without being impeded in any way by thermal insulating support device 1.

Furthermore, since sleeve 32 that is interposed between support frame 20 and base frame 10 is formed of material provided with thermal insulation characteristics as described above, transmission of cryogenic energy from support frame 20 to base frame 10 is suppressed, so there is no possibility of an unintended drop in thermal insulating performance being caused.

Furthermore, if a large force acts in the forwards/rearward direction along the axis on pipe 100 supported in insulating support device 1, this force is transmitted to side plates 12 of base frame 10 through support shafts 30 from support frame 20 and is transmitted to end plates 13 of base frame 10 through stopper blocks 40 from support frame 20.

That is, any large forces acting on pipe 100 are absorbed by base frame 10 as a whole by passing through support shafts 30 and stopper blocks 40, and pipe 100 is therefore supported without any impediment from insulating support device 1.

Furthermore, since stopper blocks 40 that are interposed between support frame 20 and base frame 10 are formed of material having thermal insulating characteristics as described above, the transmission of cryogenic energy from support frame 20 to base frame 10 is suppressed. Therefore, there is no possibility of unintended impairment of thermal insulating performance.

Also, by for example increasing the number of support shafts 30 to three or more, the load-withstanding ability provided by support shafts 30 can be increased. As a result, even if a large force in the forwards/rearward direction acts on pipe 100, pipe 100 can be reliably supported even without using stopper blocks 40. In other words, the construction of the thermal insulating device can be simplified.

Furthermore, considering the thermal insulating support device as a module, the piping can be reliably supported by suitably setting the number of such devices and determining the construction in which the locations on piping 100 that need to be supported are supported by a plurality of the support devises that are not provided with stopper blocks 40.

It should be noted that, in the thermal insulating support device 1 described above, support shafts 30 were formed of resin material (FRP). As an alternative construction of the thermal insulating support device according to the present invention, it would be possible to construct the support shafts of ceramic material having thermal insulation characteristics and sufficient mechanical strength to support the piping.

The thermal insulating support device for which support shafts formed from ceramic material are adopted differs from the thermal insulating support device 1 shown in FIG. 1 to FIG. 5 solely in respect of the material of the support shafts. The shape of the support shafts and the rest of the construction apart from the support shafts are exactly the same as in the thermal insulating support device 1, so illustration of its construction in the drawings and description of the construction are omitted.

Exactly the same action and benefits as in the case of the thermal insulating support device 1 shown in FIG. 1 to FIG. 5 are of course obtained with the thermal insulating support device in which support shafts formed of ceramic material are employed.

Figure 6:
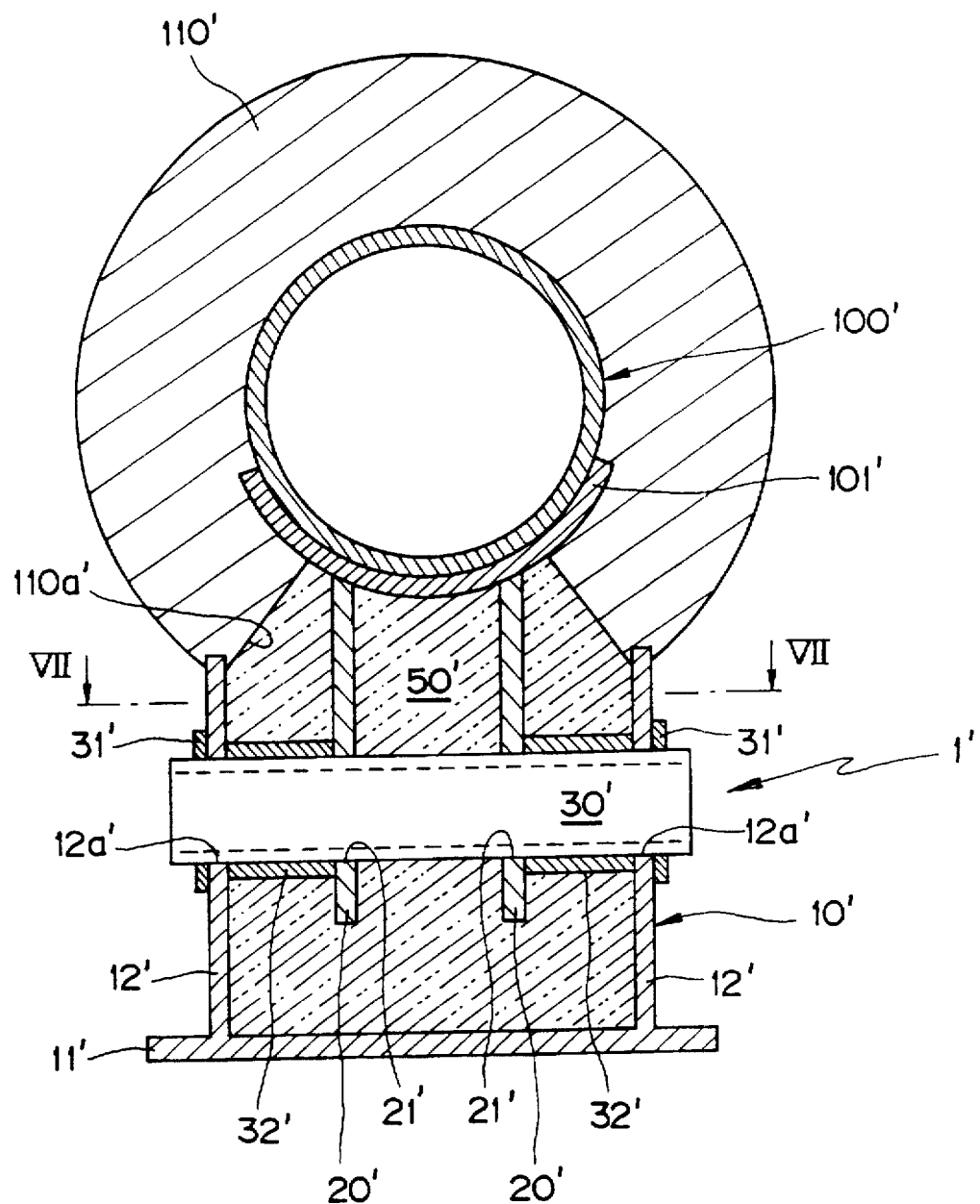
FIG. 6 is a front cross-sectional view of major parts illustrating another embodiment of a thermal insulating support device for piping according to the present invention.
Figure 7:
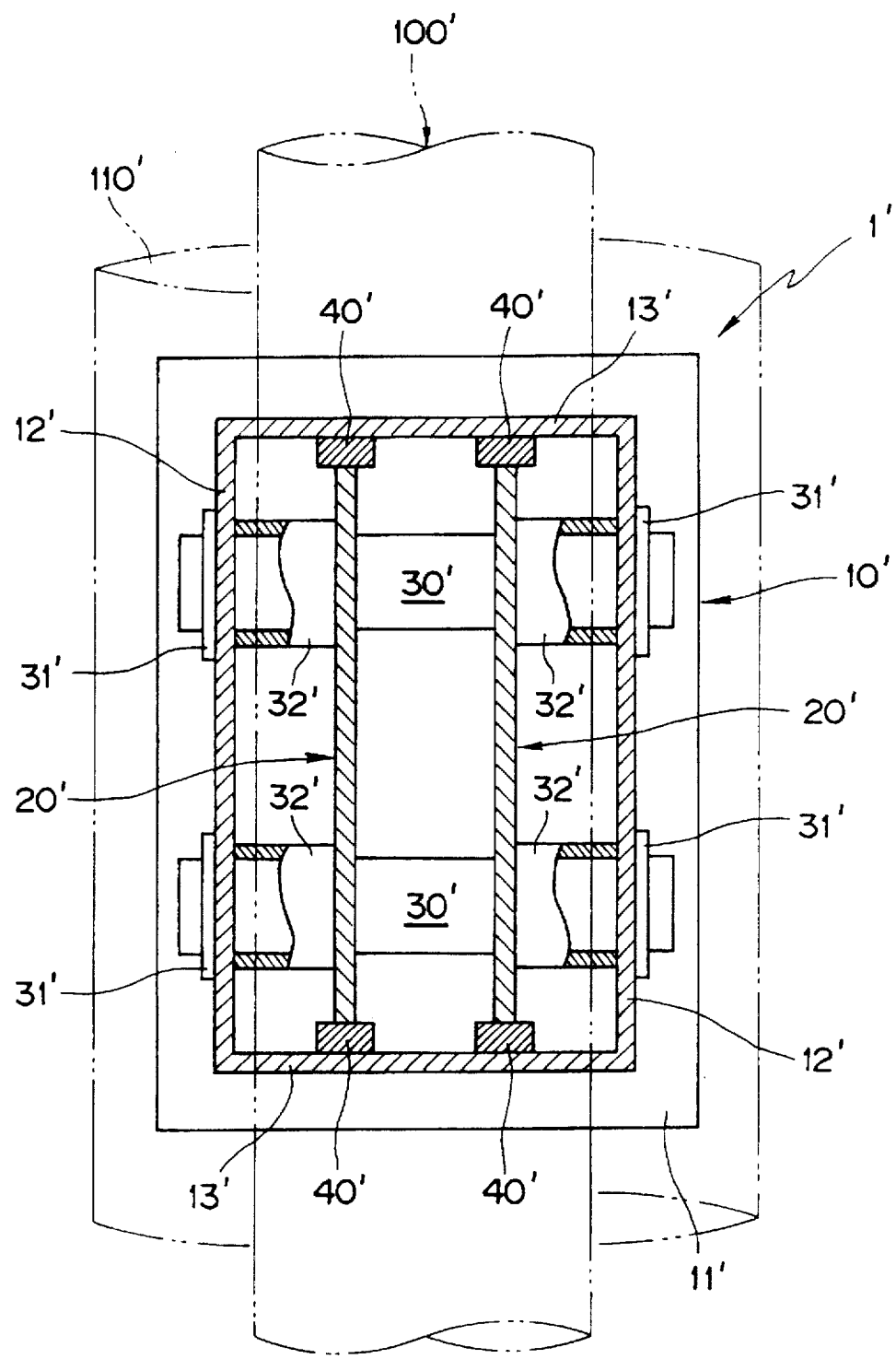
FIG. 7 is a cross-sectional view along the line VII—VII of FIG. 6.

FIGS. 6 and 7 illustrate another embodiment of the thermal insulating support device. In FIGS. 6 and 7, a thermal insulating support device 1' comprises a pair of support frames 20' fixed at the bottom of pipe 100'. On support shafts 30' passing through support holes 21' of the support frames 20', sleeves 32' for restricting the movement in the transverse direction of support frames 20' are provided in a manner inserted between support frames 20' and side plates 12' of base frame 10'.

It should be noted that, in this thermal insulating support device 1', structural elements other than the pair of support frames 20' and sleeves 32' are essentially the same as the thermal insulating support device 1 described with reference to FIG. 1 to FIG. 5, so elements which have the same function as structural elements of thermal insulating support device are given the same reference symbols with the addition of the symbol ('), and detailed description thereof is omitted.

Also, the materials of the various members constituting the thermal insulating support device 1' are in accordance with the thermal insulating support device 1 of the described earlier, so detailed description of the materials is omitted.

The same actions and benefits as in the case of the thermal insulating support device 1 shown in FIG. 1 to FIG. 5 are of course obtained with the thermal insulating support device 1' constructed as above.

The major components of thermal insulating support device 1 and thermal insulating support device 1' according to the present invention as described above are FRP pipe or the like constituting the support shafts and metallic material such as carbon steel sheet and/or stainless steel sheet constituting the base frame etc. The thermal insulating support device can therefore be easily manufactured on site since these materials can be assembled by the simple mechanical processing of cutting and welding.

Also, since the construction of a thermal insulating support device according to the present invention is very straightforward, it becomes possible to cut the number of components and improve adaptability as well as cutting transport costs and manufacturing costs. Furthermore, change of the piping can be made rapidly on site so the continuity of the work process can be ensured.

Figure 8:
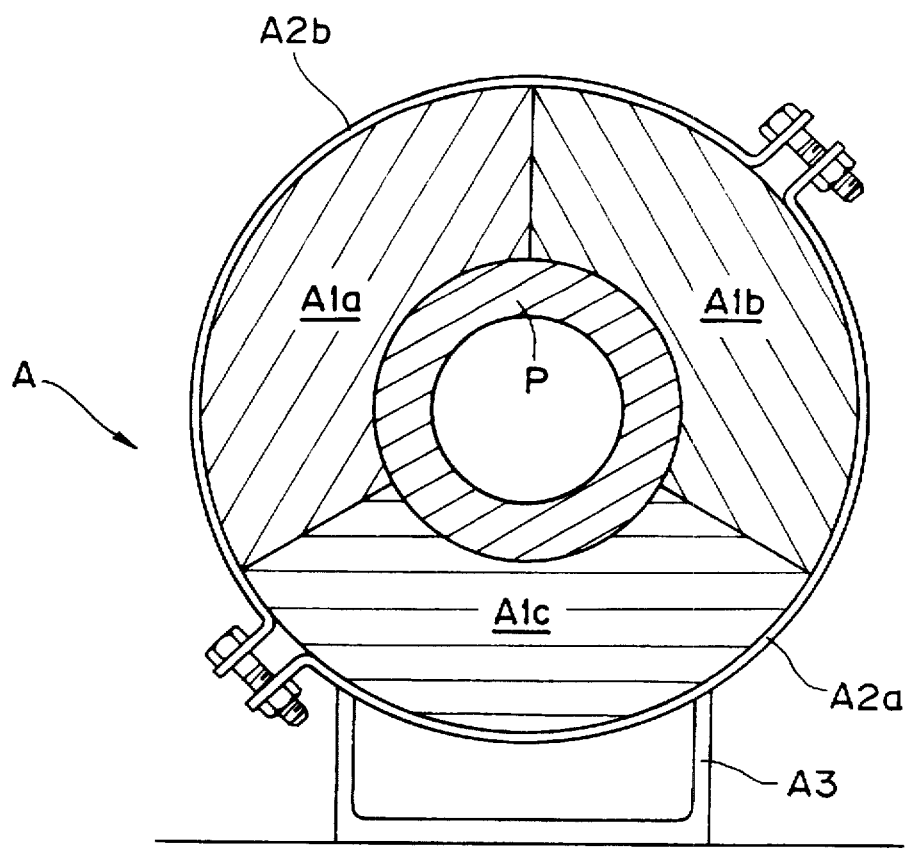
FIG. 8 is a cross-sectional view illustrating a conventional thermal insulating support device together with a pipe.

Furthermore, since the thermal insulating support device according to the present invention has a construction wherein the various structural elements are mutually mechanically united, in contrast with the conventional thermal insulating support device (see FIG. 8), in which the piping is held by frictional force using a pipe clamp, it provides a stable construction of high reliability and the reliability of mechanical strength calculations is also extremely high.

Needless to say, the thermal insulating support device according to the present invention can be applied with great benefit not only in the laying of various pipes in various kinds of plants apart from chemical plants but also in various industrial fields in which piping of various types needs to be supported while maintaining thermal insulation.

What is claimed is:

1. A thermal insulating support device for piping, comprising:
   a base frame comprising a bottom plate, a pair of side plates and a pair of end plates integrally formed with each other;
   a support frame of a plate shape and formed with a support hole, the support frame being fixed at a bottom of the piping;
   a support shaft made of resin material extending through the support hole of the support frame and fixedly supported by the pair of side plates on the base frame, the support shaft having thermal insulation properties and mechanical strength sufficient for supporting the piping; and
   a pair of stopper blocks provided on inside faces of the pair of end plates in the base frame such as to be interposed between the edges of the support frame and the end plates, the stopper blocks 40 being made of a material having thermal insulation properties and mechanical strength sufficient for supporting the support frame.

2. A thermal insulating support device for piping, comprising:
   a base frame comprising a bottom plate, a pair of side plates and a pair of end plates integrally formed with each other;
   a support frame of a plate shape and formed with a support hole, the support frame being fixed at a bottom of the piping;
   a support shaft made of ceramic material extending through the support hole of the support frame and fixedly supported by the pair of side plates on the base frame, the support shaft having thermal insulation properties and mechanical strength sufficient for supporting the piping; and
   a pair of stopper blocks provided on inside faces of the pair of end plates in the base frame such as to be interposed between the edges of the support frame and the end plates, the stopper blocks 40 being made of a material having thermal insulation properties and mechanical strength sufficient for supporting the support frame.

* * * * *